Jan. 27, 1953    F. L. DERROR ET AL    2,626,550
VEHICLE MOUNTED IMPLEMENT
Filed Oct. 9, 1946    3 Sheets-Sheet 1
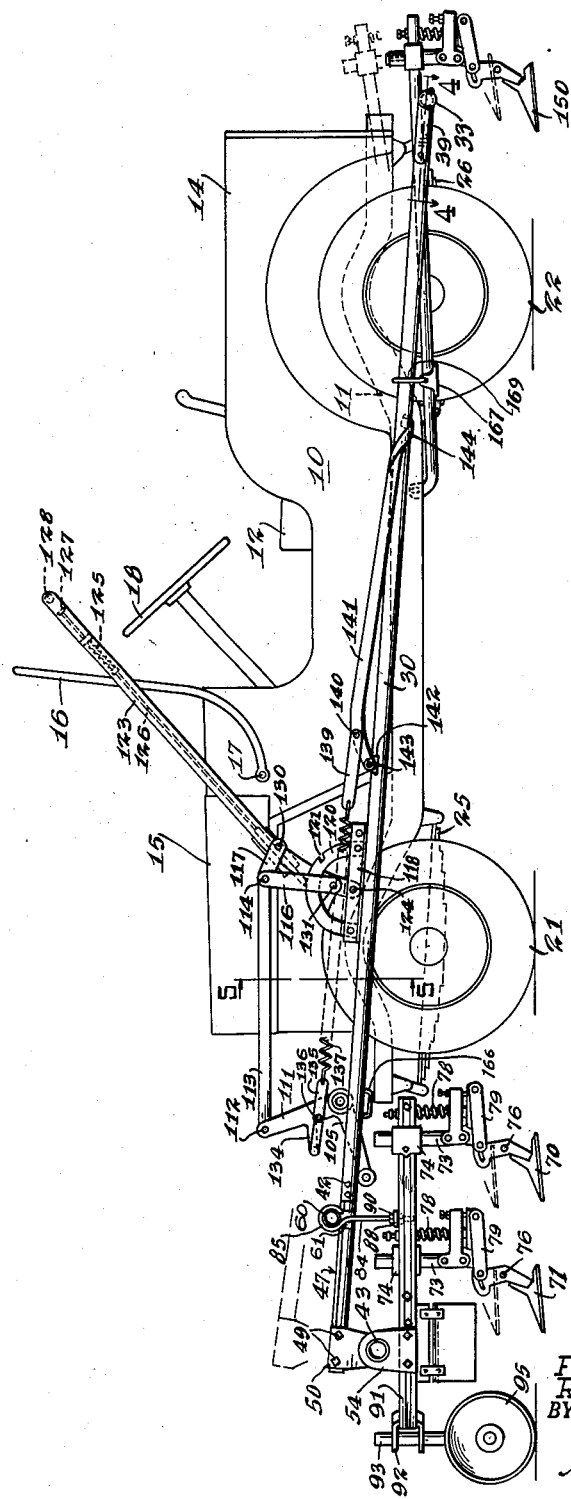
FIG-1-
INVENTORS
FRED L. DERROR
RALPH P. GRAMLY
BY
Harry O. Ernsberger
ATTY.

Jan. 27, 1953  F. L. DERROR ET AL  2,626,550
VEHICLE MOUNTED IMPLEMENT
Filed Oct. 9, 1946  3 Sheets-Sheet 2
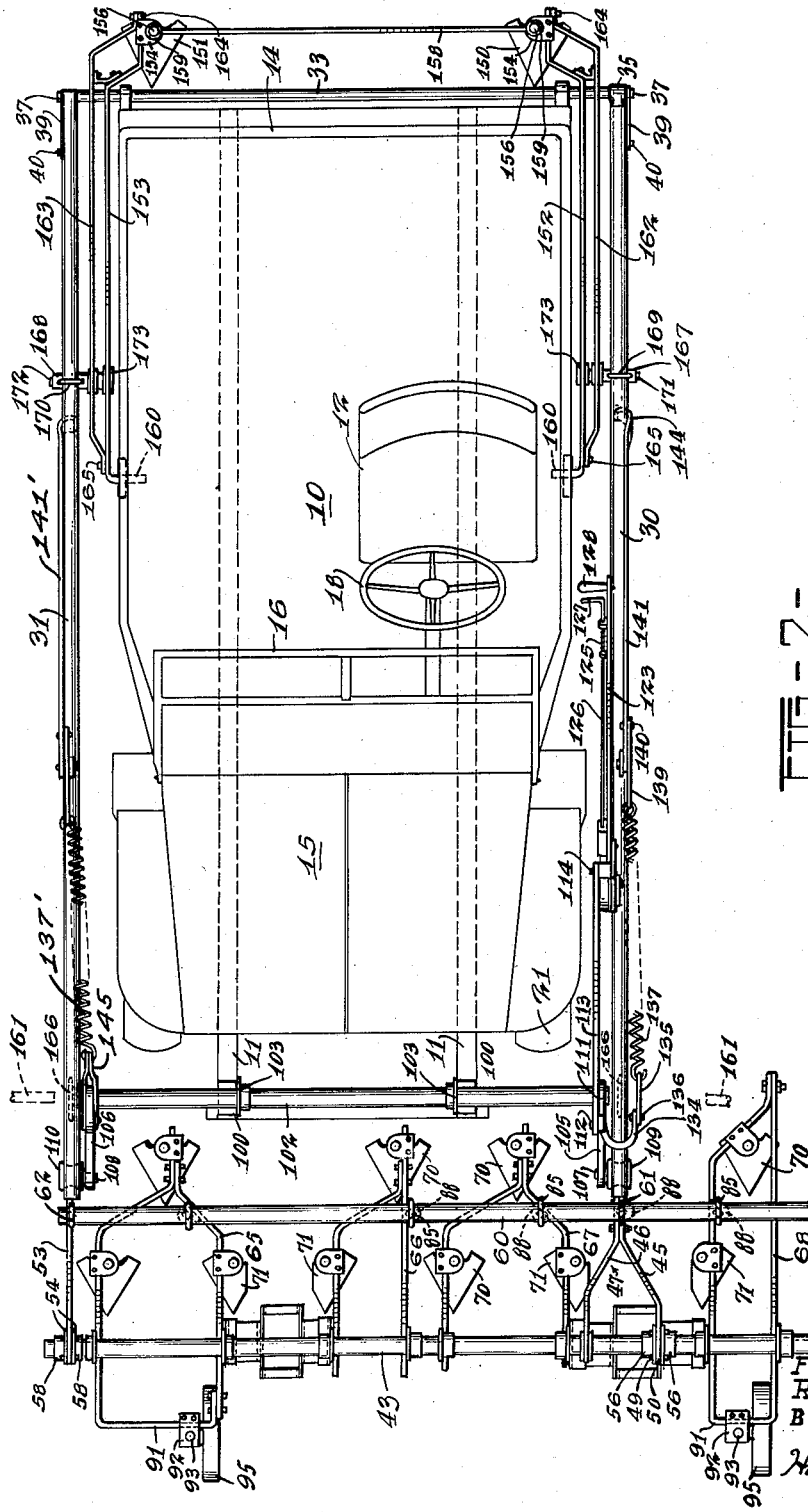
FIG-2-
INVENTORS
FRED L. DERROR
RALPH P. GRAMLY
BY
ATTY.

Jan. 27, 1953  F. L. DERROR ET AL  2,626,550
VEHICLE MOUNTED IMPLEMENT
Filed Oct. 9, 1946  3 Sheets-Sheet 3
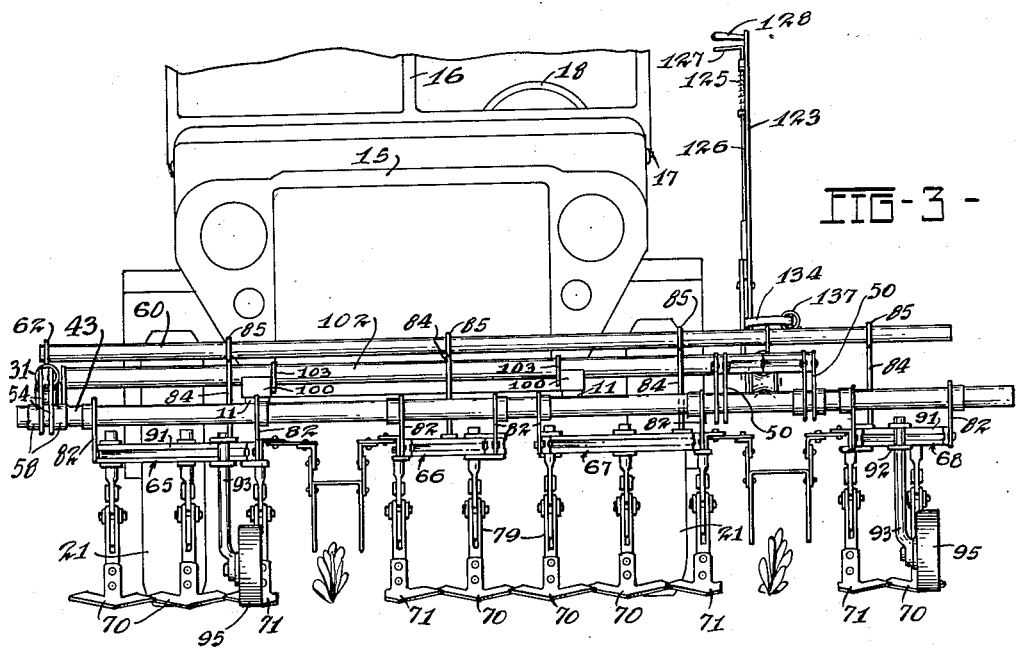
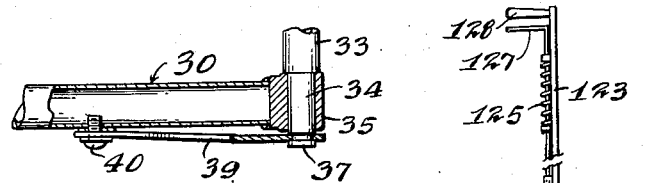
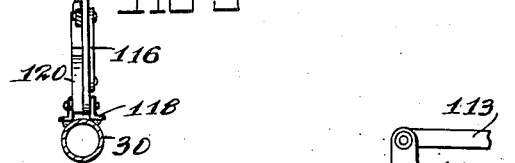
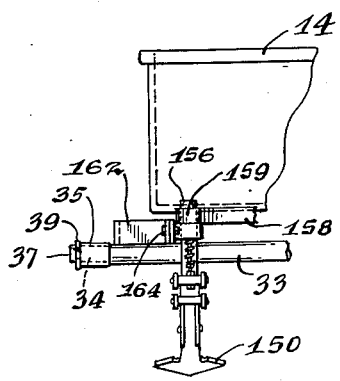
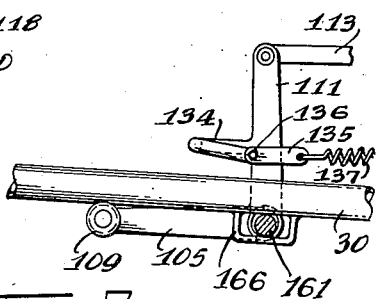
INVENTORS
FRED L. DERROR
RALPH P. GRAMLY
BY
Harry O. Ernsberger
ATTORNEY Patented Jan. 27, 1953

2,626,550

UNITED STATES PATENT OFFICE 2,626,550

VEHICLE MOUNTED IMPLEMENT

Fred L. Derror and Ralph P. Gramly, Mansfield, Ohio, assignors of one-half to Farm Tools, Inc., Mansfield, Ohio, a corporation of Indiana, and one-half to Willys-Overland Motors, Inc., Toledo, Ohio, a corporation of Delaware Application October 9, 1946, Serial No. 702,306

4 Claims. (Cl. 97—47)

This invention relates to vehicle mounted implements and in particular to an arrangement of load moving or earth working mechanism especially adapted to be associated with a vehicle of a four wheel drive type.

The invention more particularly comprehends the provisions of a soil working or load moving implement which is adapted for mounting upon a four wheel drive vehicle and wherein the soil working or load moving apparatus is disposed for operation forwardly of the vehicle.

Another object is the provision of a load moving, and more particularly a soil cultivating apparatus, wherein the load or soil engaging elements are disposed forwardly of the vehicle and wherein the working stress or thrust is transmitted to the rear of the vehicle frame.

An object of the invention resides in the provision of a load or soil moving apparatus which is readily adaptable for attachment to and use with a four wheel drive vehicle the latter being arranged for road or highway use as well as for soil cultivation or load moving use.

Another object resides in the provision of simple yet effective means for elevating or lifting the soil working or load moving apparatus to an out of use position whereby the vehicle and the soil or load moving apparatus may move along a highway at a comparatively high rate of speed.

A further object of the invention resides in the provision of a soil cultivating or working mechanism which may be readily attached or detached from a prime mover without the use of tools.

Still another object of the invention is the provision of a soil moving or cultivating arrangement wherein the soil engaging means may be shifted or adjusted laterally for the purpose of accommodating various widths of crop rows or for any other purpose.

Another object of the invention resides in the provision of soil engaging means disposed forwardly of the vehicle and a second soil engaging means disposed at the rear of the vehicle in combination with single means operable to simultaneously elevate or lower both said soil engaging means.

Still another object is the provision of a load moving or shifting apparatus adapted to be attached to a prime mover and having a means for elevating or lowering the load moving means including a resilient weight and counterbalancing means whereby the force required to elevate said soil moving apparatus is reduced to a minimum.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which:

Figure 1 is a side elevational view of a vehicle and soil working or load moving apparatus of our invention;

Figure 2 is a top plan view of the vehicle and soil working or load moving apparatus of our invention;

Figure 3 is a front elevational view of the vehicle and soil working or load moving apparatus of our invention;

Figure 4 is an enlarged fragmentary detail sectional view taken substantially on the line 4—4 of Figure 1;

Figure 5 is a detail sectional view taken substantially on the line 5—5 of Figure 1;

Figure 6 is a rear view of a portion of a vehicle showing the mounting of one of the rear cultivator shovels; and Figure 7 is a fragmentary detail view illustrating elements of the cultivator elevating and lowering means.

While we have illustrated a soil working implement or cultivator of a character particularly adapted for use with a four wheel drive vehicle in cultivating row crops, it is to be understood that we contemplate various forms of soil working or load moving apparatus for purposes other than that disclosed herein.

Referring to the drawings in detail, the arrangement of our invention has particular utility with a four wheel vehicle in which all four wheels may be employed as drive wheels and, as illustrated, the vehicle is inclusive of a body 10 supported upon a chassis frame 11 the body being preferably configurated to provide a vehicle operator's seat 12, to the rear of which is disposed a package compartment 14. The vehicle is inclusive of a bonnet or hood 15 which encloses an engine or other prime mover (not shown). Arranged at the forward portion of the body 10 is a windshield 16 preferably pivotally supported upon a pivot pin 17 and arranged to be folded forwardly about the axis of pivot 17 to an out-of-use position if desired. The vehicle body and associated elements are supported by pairs of front and rear road wheels designated 21 and 22 respectively, all of which may be driven from the engine contained in the bonnet 15 by suitable transmission mechanism (not shown). The mechanism is so arranged as to permit the rear wheels to be connected to the engine or for connecting both pairs of front and rear wheels to the engine and driven thereby. The front wheels 21 are adapted to be connected to the frame 11 of the vehicle by means of springs 25 while the rear wheels are connected to the vehicle frame by means of springs 26.

Through the utilization of a vehicle of this character supported upon four wheels which may all be connected to the engine and driven thereby, there is attained a traction factor much greater than that attainable with a two wheel drive vehicle. The utilization of a vehicle in which it is optional to obtain either a two wheel or a four wheel drive is particularly adaptable for use with the apparatus of our invention as a four wheel drive combination provides the necessary tractive effort for cultivating or moving heavy loads while the two wheel drive is especially adaptable for operating the vehicle efficiently upon smooth highways or road ways at a comparatively high speed. Moreover, the four wheel drive vehicle is adapted for obtaining satisfactory operation of the vehicle when the soil working or moving apparatus is operated in soft earth or rough terrain conditions.

In the embodiment of our invention as illustrated in the drawings, the load moving or soil working implements or mechanisms are of a character particularly adapted or adaptable for cultivating crops which are arranged in successive rows which are spaced or disposed as to permit the wheels of the vehicle to pass between or the vehicle to straddle certain crop rows. While we have shown one form of cultivator which is found to be particularly satisfactory in cultivating most soils, it is to be understood that any type of soil working or other earth working or moving implement may be employed.

Disposed longitudinally of the vehicle and at each side thereof are strut members or bars 30 and 31 which are preferably of tubular cross section. Secured to the rear of the vehicle frame 11 and extending transversely thereof is a bar 33 which is bolted, welded or otherwise fixedly connected to the vehicle frame. The end portions of the transversely extending bar 33 are formed with cylindrical tenons 34 as particularly shown in Figure 4 and the rear extremities of the tubular struts 30 and 31 are configurated to form a boss portion 35 which is bored transversely to fit over the tenons 34 on the bar 33. Each of the tenons 34 is provided with a head portion 37 and adjacent each head portion 37 is a recess formed to receive or accommodate a locking member 39, the latter being pivoted to a strut by means of a pivot pin or rivet 40 as shown in Figure 4. By moving the locking arms or straps 39 until the notches therein engage in the kerfs or recesses in a tenon portion 34 adjacent the heads 37, the struts 30 and 31 may thus be fixedly locked in position, establishing a pivotal connection for the struts 30 and 31 with bar 33. As particularly shown in Figures 1 and 2, the struts 30 and 31 project forwardly of the vehicle, and the forward portions of the struts are arranged to carry or mount the soil working or load moving mechanism. To this end a mounting means is provided which is inclusive of a transversely extending tube or member 43 which is adapted to be connected to the struts 30 and 31 by suitable means. The connecting means, as shown in Figures 1 and 2, includes a pair of arms 45 and 46 which are configurated so that in assembled condition they form a Y-shaped bracket 47. The rear portions of the arms 45 and 46 are arranged in juxtaposed relationship, being bolted together, and extending into the open end of the tubular strut 30 and are bolted thereto by suitable bolts 42. Secured to the forward ends of the members 45 and 46 by means of bolts 49 are sets of depending plates 50 which are bored to receive the transverse tube 43. Additional connecting means is provided between the strut 31 and bar 43 which is inclusive of a uniplanar member or bar 53 to which is secured a set of depending plates 54 similar to plates 50, and which are also bored to receive and accommodate the bar 43. Means are provided to prevent lateral shifting of the tube or member 43 with respect to the connecting means and which is inclusive of a pair of adjustable collars or abutments 56 mounted on the tube 43 at either side of one of the sets of plates 50 as shown in Figures 2 and 3. Collars or abutments 58 are also arranged at either side of the plates 54 and are adjustable along the bar 43 to position the member 53 in proper relationship on the bar 43. The sets of collars 56 and 58 are provided with suitable set screws for locking the collars in adjusted position.

A second tubular member or tube 60 extends parallel with the tubular member 43, the tube 60 being secured to members 47 and 53 by suitable clips 61 and 62 as shown in Figure 1. The tube 60 provides a supplemental supporting means for cultivator mechanism in a manner hereinafter explained.

The transverse bar 43 is adapted to carry a plurality of supplemental frames 65, 66, 67 and 68 which supplemental frames provide a means for carrying the cultivator points or shovels 70 and 71. Figure 1 illustrates in side elevation a form of cultivator shovel and mounting arrangement, but it is to be understood that any form of cultivator or soil working or moving construction may be utilized in our arrangement. Each cultivator shovel unit is inclusive of a vertically disposed rod 73 which is connected to its supporting frame by suitable means in the form of a clamp 74 so that rod 73 may be vertically and rotatably adjusted with respect to its supporting frame. Pivoted to the rods or supports 73 by means of pivot pins 76 are cultivator points or shovels 70 and 71. The cultivator points 70 and 71 are resiliently maintained in normal cultivating or soil working position by means of springs 78 operating in conjunction with linkage 79, the details of this arrangement however forming no pertinent part of the present invention. This arrangement of shovel mounting provides for relative pivotal movement of cultivator shovels about their supports in the event that obstructions are encountered which might otherwise damage the cultivator shovels. The shovels 71 differ in configuration from shovels 70 in that adjacent pointed projections are omitted as shovels 71 straddle the crop rows and projecting points might cause damage to the roots of the plants.

Disposed between each set of cultivator shovels 71 is a plant guard means. This means in the embodiment illustrated is inclusive of a pair of spaced plates adjustable laterally and vertically to accommodate various types and heights of growing plants of crop rows. One set of guard plates is carried by frames 65 and 66 and the other set of guard plates is carried by the frames 67 and 68.

The frames 65, 66, 67 and 68 are formed with sets of upwardly extending plates 82 which are suitably bored to be fitted upon the bar 43. Each of these frames is connected to the transverse bar 60 by means of rods 84 having loops or eyes 85 which surround the bar 60. The lower extremities of the rods 84 are threaded and are arranged to pass through transversely extending ears 88 formed on the frames 65, 66, 67 and 68, and are adapted to receive a pair of adjusting nuts 90 arranged above and below the projections 88 so that the rear portions of the frames 65, 66, 67, 68 may be adjusted vertically to establish the proper relationship of the cultivator shovels with respect to the supporting bars 43 and 60.

The frames 65 and 68 are each formed with a transversely extending bar-like portion 91 which are adapted to support C-shaped clamps 92 which straddle the bars, each clamp carrying a vertically disposed rod 93. The clamps 92 are arranged to be fixedly yet adjustably secured to the transverse portions 91 of frames 65 and 68 by means of set or locking screws (not shown). Mounted upon the lower extremities of each of the rods 93 is a transversely extending spindle (not shown) upon which is suitably journaled depth gauging wheels or guides 95. In operation, the wheels 95 contact the surface of the soil or earth and function to predetermine the depth of operation of the cultivator points or shovels 70 and 71.

The soil or load moving implement elevating and lowering means will now be described. Mounted upon the forward extremities of the vehicle frame 11 is a pair of seats or pillow blocks 100 which are arranged to support a transversely extending tube or bar 102, the latter being arranged for rotative movement in the seats 100. Welded or otherwise secured to the bar are a pair of flanged members 103 which respectively abut the seats 100 to limit or prevent lateral movement of the bar 102. Welded or otherwise secured to the extremities of the transverse bar 102 are forwardly extending arms 105 and 106, the forward ends of which support stub shafts 107 and 108 upon which are journaled rollers 109 and 110. The rollers 109 and 110 are formed with grooved peripheries to adapt them for cradled engagement with the forward portions of the struts or bars 30 and 31.

The member 105 has an upwardly extending arm 111 and pivotally secured to the upper end of portion 111 by means of pin 112 is a link 113. The opposite end of link 113 is pivotally connected by means of a pin 114 to a link 116 and to a second link 117. Welded or otherwise fixedly secured to the strut or bar 30 is a member 118 which is preferably of right angle configuration in cross section. Mounted upon the member 118 by means of bolts or other suitable securing means is a sector or quadrant 120 which has a serration or kerf 121 formed therein. Also pivotally connected to the upwardly extending portion of member 118 is a manipulating means or lever 123 which is arranged for pivotal movement about a bolt or stub shaft 124 as shown in Figure 1. Arranged in parallelism with the manipulating lever or means 123 is a rod 126 which is slidable longitudinally of the lever 123 and is provided with a hand grip portion 127 at its upper extremity, the latter being disposed below a handle 128 projecting laterally from lever 123. Spring means 125 is provided serving to urge the rod 126 to its lowermost position so that the lower end thereof is arranged for engagement in the recess 121 in the quadrant 120 for the purpose of securing or maintaining the soil moving means in elevated position in a manner to be hereinafter explained. The link 117 is connected to the lever 123 by means of a bolt or pivot pin 130 and the link 116 is secured to the lever 123 by means of a bolt 131.

Means are provided for counterbalancing a major portion of the weight of the soil moving implement and associated mechanism so as to minimize the amount of force or effort required to move the lever 123 in elevating the mechanism. To this end there is welded or otherwise secured to arm 111 a U-shaped portion or member 134 to the extremity of one leg of which is connected a link 135 pivoted to member 134 by means of pivot pin 136. Connected to the opposite end of link 135 is a contractile spring 137, the opposite end of which is connected to a link 139 the other end of the link being pivotally connected by means of a pin 140 to a bar 141. Secured to the bar or strut 30 is a bracket 142 the forward extremity of bar 141 being pivotally secured by means of a bolt 143 to the bracket 142. The rear extremity of bar 141 is formed with a laterally extending hooklike portion 144 which is adapted to extend under and engage the bar 30 in order to impress initial tension upon the spring 137. At the opposite side of the vehicle, the arm 106 is pivotally connected to a clevis bar 145 which, in turn, is connected to one end of a spring 137'. The spring 137' is connected to a bar 141' the latter being of the same construction as bar 141 and arranged to engage or hook under the strut 31. When bars 141 and 141' are in the position shown in Figure 2, viz. with the hooklike portions in engagement with strut 30 and 31, the springs 137 and 137' are distended to exert an upwardly directed force to the forward portion of the struts 30 and 31 through rollers 109 and 110 to counterbalance or offset a substantial portion of the weight of the soil moving mechanism and elements associated therewith.

It is desirable in an arrangement of cultivating mechanism to provide means for loosening the soil that has been traversed and tramped by the vehicle wheels. To this end there are disposed at the rear of the vehicle and in alignment with the tread of the wheels the cultivator shovels 150 and 151 shown in Figures 2 and 6. As the cultivator mechanisms 150 and 151 are substantially the same as the individual cultivator units arranged at the forward portion of the vehicle, it is believed unnecessary to further describe in detail the rear cultivator units. The cultivator units 150 and 151 are supported upon bars 152 and 153 by means of clamps 154 of the same construction as clamps 74 which hold the forward cultivator units to their supporting means. The units 150 and 151 are mounted upon vertically disposed shafts or bars 156 of the same construction as the bars 73 of the forward cultivator assembly. In order to hold the rear cultivators in proper spaced relation, we have provided a transversely extending member 158, each end of which is configurated to form loops 159 which fit over the projecting upper ends of vertical rods 156, and in this manner the bar 158 functions to maintain the proper spacing of the rear cultivating units.

As shown in Figure 2, the bars 152 and 153 extend forwardly and each is provided at its forward extremity with a transversely and inwardly extending portion 160 arranged to project beneath and engage a lower edge of the body 10 of the vehicle as shown in Figure 2. A reinforcing means is provided for the bars 152 and 153 in the form of members 162 and 163 which are bolted respectively to members 152 and 153 by means of bolts 164 and 165. A support is provided for bars 152 and 153 in the form of members 167 and 168 connected respectively to the struts 30 and 31 by means of U shaped bolts or clamps 169 and 170. Journaled within members 167 and 168 are transversely extending stub shafts 171 and 172 which are configurated with bracket portions 173 which are bolted, welded or otherwise secured to the bars 152, 162, 153 and 163. By this means the stub shafts 171 and 172 provide journal means whereby upward movement of the struts 30 and 31 will move the members 167 and 168 upwardly to elevate the rear cultivator units 150 and 151.

The adaptation of the arrangement of our invention to a four wheel drive vehicle and the operation of the implement and the control mechanism is as follows. As shown in Figures 1, 2 and 3 inclusive of the drawings, the load moving or soil cultivating implement is illustrated in operative position for working or moving the soil. In this position of the apparatus, the guide or depth wheels 95 are in engagement with the ground surface and the cultivator shovels or points 70 and 71 are in a position to engage or move into the ground upon forward movement of the vehicle. The cultivator shovels 150 arranged rearwardly of the vehicle are also in a position to engage in the soil. As the vehicle moves forwardly, the cultivator shovels 70, 71 and 150, by reason of their pointed contours and their mounting construction, move beneath the ground surface for breaking up or cultivating the soil, the depth of operation of the shovels being limited by the engagement of the depth gauging wheels 95 with the ground surface. During the cultivating or load moving operations, the manipulating lever 123 is in the position shown in Figure 1 in which position the rollers 109 are in the lowermost position to lower the thrust members or struts 30 for the carrying on of soil cultivating operations.

When it is desired to elevate the soil moving or cultivating means, the operator grasps a handle member 128 of lever 123 and swings the lever downwardly in a clockwise direction about the pivot pin 124 as viewed in Figure 1. This movement of the lever is continued until the pawl tooth or abutment (not shown) formed at the lower end of rod 126 engages in the detent or kerf 121 in the quadrant or sector 120. The pawl is urged into the recess by conventional spring means 125 operating longitudinally and downwardly on the rod 126. This movement of lever 123 for elevating the cultivating mechanism is executed with facility and without the exertion of a large amount of effort as the weight counterbalancing spring 137, acting through member 134, serves to offset a large portion of the weight of the cultivator mechanism by reason of the spring acting in a coordinated direction with the movement of lever 123. As the lever 123 is moved in a clockwise direction, the link 113 moves the member 105 in a clockwise direction about the axis of the transversely extending tube or rod 102, the latter being supported in cradles or pillow blocks 103 carried by the vehicle frame. This movement of arm 105 moves the rollers 109 upwardly, simultaneously elevating the forward extremities of the struts 30 and 31, the latter pivoting about the axis of the tenons 34 formed on the transversely extending bar 33 which is secured to the rear of the vehicle frame. The forward portions of struts 30 and 31 being connected to the cultivating or soil moving implement through the intermediary of members 45—50 and the suspension links 84 will move the forwardly mounted cultivator unit upwardly, the struts 30 and 31 being moved to the dotted position indicated in Figure 1. This operation moves the cultivator shovels 70 and 71 and the depth gauge wheels 95 upward and out of engagement with the ground surface. Simultaneously with the upward movement of the forward portion of struts 30 and 31 the cultivator shovels 150 disposed rearwardly of the vehicle are also moved upwardly in the following manner. The inwardly turned extremities 160 of the bars 152 and 153 contact the lower surface of the vehicle body as shown in Figures 2 and 3 and as the bars 152 and 153 are connected through the brackets 167 and shafts 171 and 172 with the struts 30 and 31 respectively so that as these elements are moved upwardly through the clockwise pivotal movement of struts 30 and 31 around the axis of tenons or shafts 34, the bars 152 and 153 will be moved or pivoted upwardly in a counterclockwise direction about the point of engagement of projections 160 with the vehicle body as a pivotal axis which action elevates the cultivator shovels 150 above the ground surface to the position indicated in dotted lines in Figure 1. With the cultivator mechanisms both forwardly and rearwardly of the vehicle disposed above the ground line or surface the vehicle may be operated on roadways or in any locale for purposes of transporting the cultivator rapidly from one place to another or the vehicle may be used for other purposes of transportation or communication without interference or encumbrance of the cultivating mechanism.

When soil cultivating or load moving operations are to be resumed the operator grasps the handle and grip portions 128 and 127 respectively, withdrawing the pawl from engagement in the detent or recess 121 in the quadrant and swings the lever 123 in a counterclockwise direction until the lever is disposed in the position shown in Figure 1. This movement through the linkage and rollers 109 lowers the forward ends of struts 30, 31 and the bars 152, 153 whereby the soil moving or cultivator units both forwardly and rearwardly of the vehicle are permitted to reengage the soil.

The arrangement of our invention is fabricated for rapid disassembly or assembly with the vehicle in the following manner. When it is desired to disconnect the cultivator from the vehicle, the transverse bar 158 disposed rearwardly of the frame is removed by simply elevating the bar to disengage the loops 159 from the vertical stub shafts 156. The lever 123 is moved to its lowermost position to elevate the cultivating mechanism. With the mechanism in elevated position the operator inserts short shafts 161 through the brackets 166 welded to the struts 30 and 31 and into the hollow interior portions of the transversely extending tube 102 which is supported upon the vehicle frame, these shafts being indicated at 161 in dotted lines in Figure 2 and extending outwardly and beneath the struts 30 and 31. The shafts 161 act as a temporary lock to prevent lowering the cultivator mechanism. With the shafts inserted in the stated positions, the stub shafts 161 prevent the cultivator from reengaging the ground. In this position, the vehicle operator may now release the tension of spring 137 by disconnecting the hook-like extremities 144 formed on bars 141 from engagement with the struts 30 and 31. The bars 141 may then be pivotally moved around the pivot axis 143 in a counterclockwise direction which permits a contraction of springs 137 to normal position. The operator then disconnects the struts 30 and 31 from the transverse bar 33 by swinging the locking plates 39 out of engagement with the recesses in tenons 34 so that the struts 30 and 31 may be sprung outwardly away from the shaft 33. This outward springing movement of shafts 30 and 31 permits the bars 152 and 153 to be moved outwardly to disengage the projections 160 from the vehicle body and in this manner the rear portion of the apparatus is disconnected from the vehicle. When it is desired to dismount or disengage the load moving implement from the vehicle, the operator elevates the rear extremities of struts 30 and 31, and the bars 152 and 153 disposed in a substantially vertical position with portions of the bars in engagement with the struts 30 and 31. As the struts 30 and 31 are elevated to this position, the wheels 95 or the shovels 71 will engage the ground or other supporting surface, which engagement during upward movement of the struts raises the transverse bar 102 above and out of engagement with the seats or pillow blocks 100, thus freeing the load moving implement from the vehicle. The vehicle may then be "backed away" from the implement without interference. The implement may be disengaged from the vehicle without elevating the struts 30 and 31 in the manner above described by manually lifting the implement and moving it slightly forwardly of the vehicle to disengage the transverse bar 102 from the seats or blocks 100. The cultivator or soil moving unit may be reassembled and connected to the vehicle by reversing the sequence of operations just described.

It is apparent that, within the scope of the invention, modifications and different arrangements may be made other than are herein disclosed and the present disclosure is illustrative merely, the invention comprehending all variations thereof.

What we claim is:

1. In combination with a vehicle having four power driven road wheels and a frame; a pair of struts disposed at either side of the vehicle; the rear extremities of said struts being pivotally supported adjacent the rear of the vehicle frame; a load moving implement mounted upon the forward portions of said struts and disposed forwardly of the vehicle; means supported upon the vehicle frame and arranged for engagement with said struts for elevating and lowering said struts and load moving implement; lever mechanism connected with said strut engaging means for actuating the latter; a bar pivotally connected to each of said struts; each of said bars being arranged for interengagement with said struts at points spaced from the pivotal connection of said bars therewith; and spring means connected to each of said bars intermediate the ends thereof and the means for elevating and lowering the load moving implement and struts for substantially counterbalancing the weight of said struts and said load moving implement when the latter is in elevated position, said spring means being initially tensioned when said bars are interengaged with the struts at points spaced from the pivotal connection of the bars with the struts.

2. In combination with a vehicle having four power driven road wheels and a frame; a pair of struts disposed at either side of the vehicle; the rear extremities of said struts being pivotally supported adjacent the rear of the vehicle frame; a load moving implement mounted upon the forward portions of said struts and disposed forwardly of the vehicle; means supported upon the vehicle frame and arranged for engagement with said struts for elevating and lowering said struts and load moving implement; a bar pivotally connected to each of said struts; each of said bars being configured for interengagement with said struts at points spaced from the pivotal connection of said bars therewith, and coil springs connecting each of said bars and the means for elevating and lowering the load moving implement and the struts and being tensioned when said bars are in interengagement with said struts for partially counterbalancing the weight of said load moving implement and struts when the load moving implement is in elevated position.

3. In combination with a vehicle having four power driven road wheels and a frame; a pair of main struts disposed at either side of the vehicle; the rear extremities of said struts being pivotally supported adjacent the rear of the vehicle frame; a load moving implement mounted upon the forward portions of said struts and disposed forwardly of the vehicle; means supported upon the vehicle frame and arranged for engagement with said main struts for elevating and lowering said struts and load moving implement carried thereby; lever mechanism connected with said main strut engaging means for actuating the latter to elevate the lower said load moving implement and said main struts; a bar pivotally connected to each of said main struts; each of said bars being formed for interengagement with said main struts at points spaced from the pivotal connection of said bars therewith; spring means connecting each of said bars and the means for elevating and lowering the load moving implement and the main struts; a pair of secondary struts pivotally supported upon the vehicle frame intermediate its ends; the pivotal axes of said main and secondary struts being spaced longitudinally of the vehicle; a second load moving implement carried by said secondary struts and disposed adjacent the rear of the vehicle, connecting means between said main and secondary struts whereby the second load moving implement is simultaneously raised and lowered during corresponding elevating and lowering movements of the load moving implement arranged forwardly of the vehicle, said spring means substantially counterbalancing the weight of said struts and load moving implements when the load moving implements are in elevated position.

4. In combination with a vehicle having four power driven wheels and a frame; a pair of main struts arranged at either side of the vehicle; a transversely extending bar secured to the rear of the vehicle frame; said struts being pivotally and removably connected at their rear extremities to said transversely extending bar; a load moving implement supported upon said struts and disposed forwardly of the vehicle; a shaft journaled upon the forward portion of the vehicle frame and extending transversely thereof; arms associated with said shaft; said arms carrying rollers adapted for engagement with said main struts for elevating and lowering the implement carried thereby; lever mechanism operatively connected with said shaft for rotating the latter to elevate and lower said load moving implement; a pair of secondary struts pivotally and removably connected to said vehicle frame intermediate its ends; a second load moving implement carried by said secondary struts and disposed adjacent the rear portion of the vehicle, and connections between said main and secondary struts whereby relative movements of said main struts are communicated to said secondary struts for raising and lowering the implement carried by said secondary struts.

FRED L. DERROR.
RALPH P. GRAMLY.

REFERENCES CITED

The following references are of record in the file of this patent:

UNITED STATES PATENTS

| Number | Name | Date |
|---|---|---|
| 1,268,051 | Oquist | May 28, 1918 |
| 1,522,378 | McLeod et al. | Jan. 6, 1925 |
| 1,644,885 | Jones | Oct. 11, 1927 |
| 1,827,237 | Jones | Oct. 13, 1931 |
| 1,870,740 | Leiter | Aug. 9, 1932 |
| 1,929,804 | Brown | Oct. 10, 1933 |
| 2,054,513 | Kriegbaum et al. | Sept. 15, 1936 |
| 2,064,022 | Maloon | Dec. 15, 1936 |
| 2,145,007 | Foster | Jan. 24, 1939 |
| 2,181,824 | Stuva | Nov. 28, 1939 |
| 2,225,393 | Ray | Dec. 17, 1940 |
| 2,233,237 | Anderson et al. | Feb. 25, 1941 |
| 2,404,518 | Moran | July 23, 1946 |

FOREIGN PATENTS

| Number | Country | Date |
|---|---|---|
| 715,269 | France | Sept. 22, 1931 |